(No Model.)
A. B. BEAN.
INDEX GAGE FOR DRILLING MACHINES.
No. 300,038. Patented June 10, 1884.
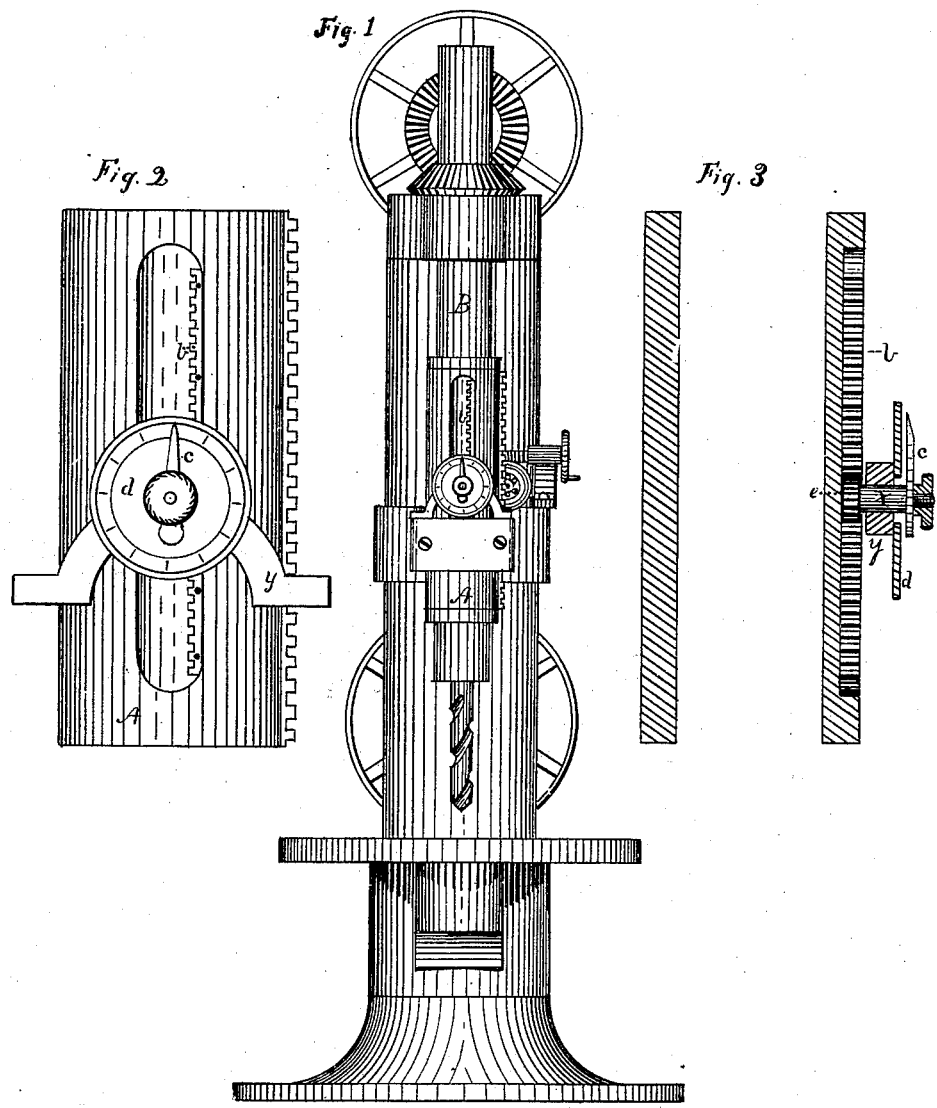
Witnesses,
George L. Barnes
C. W. Kilborn
Inventor,
Albert B. Bean
by George Terry
Atty

UNITED STATES PATENT OFFICE.

ALBERT B. BEAN, OF NEW HAVEN, CONNECTICUT.

INDEX-GAGE FOR DRILLING-MACHINES.

SPECIFICATION forming part of Letters Patent No. 300,038, dated June 10, 1884.

Application filed December 27, 1883. (No model.)

*To all whom it may concern:*

Be it known that I, ALBERT B. BEAN, a citizen of the United States of America, residing at New Haven, in the county of New Haven and State of Connecticut, have invented certain new and useful Improvements in Index-Gages for Drilling-Machines, of which the following is a specification, reference being had therein to the accompanying drawings, in which—

Figure 1 is a view of a drilling-machine provided with my index-gage. Fig. 2 is an enlarged view of the gage and of the recessed sleeve into which the pinion and rack are placed. In Fig. 3 a section of the sleeve is shown, exhibiting the full thickness of sleeve at a point where the recess does not come, and also a like section showing the recess edge of the rack, pinion, arbor, dial, and pointer.

The object of my invention is to provide convenient means for showing, in a drilling-machine while it is in operation, how far the drill has penetrated without withdrawing the same.

To enable others to make and use my improved index-gage, I will give a detailed description of the same.

The sleeve A, Fig. 1, is attached to the spindle B of a drilling-machine, and moves with the spindle in its upward and downward movement, but does not rotate with the spindle. In this sleeve a recess is formed of sufficient depth to receive the rack and the pinion, as shown in Fig. 3. The recess is also made sufficiently wide to admit the rack and the pinion. Thus recessed, the rack and pinion being in the recess, the movement of the sleeve through the box which guides its movement is in no way impeded, and the rack and pinion are entirely out of the way. The rack $b$ is a narrow strip of metal having teeth on its edge, is placed against the side of the recess, and is held in place by rivets, the heads of which are shown in Fig. 2. The pinion is attached to or is formed on the arbor $x$, which turns in its support $y$ and carries the pointer. The pointer is arranged on the round and slightly-tapering end of the arbor, and when slightly pressed onto the same is sufficiently held by friction. The outer end of the arbor is threaded and a nut is turned onto the threaded end.

For ordinary purposes I prefer to make the rack with ten teeth to the inch and the pinion with ten leaves. The pointer will then make a revolution to one inch descent of the rack and spindle, and the graduations on the dial will be fractions of an inch. Of course the teeth on the rack and the leaves in the pinion may be varied to suit the pleasure of the maker or the work to be drilled.

In using my indicator or gage, when the drill is brought against the work to be drilled, I turn the pointer to a vertical position, and as the drill and spindle descend the pointer turns and indicates the depth of hole in fractions of an inch when the depth is less than an inch. If the depth is more than an inch, the fractions, if any, must be added to the number of revolutions the pointer has made. The sum will be the depth in inches and fractions of an inch.

A dial and pointer, the pointer arranged on an arbor carrying a pinion meshing in a rack, have been used for various purposes; but

What I claim as new, and desire to secure by Letters Patent, is—

The combination, with the spindle of a drilling-machine, of a sleeve provided with a recess in which a rack is placed, and a pinion lying in said recess and meshing into said rack, said pinion being carried upon a shaft to which a pointer or other indicator is attached, as set forth.

In testimony whereof I affix my signature in presence of two witnesses.

ALBERT B. BEAN.

Witnesses:
 GEORGE TERRY,
 C. W. KILBORN.